No. 766,273. PATENTED AUG. 2, 1904.
P. LORANG.
TIRE NUT TIGHTENING DEVICE.
APPLICATION FILED MAR. 28, 1904.
NO MODEL. 2 SHEETS—SHEET 1.
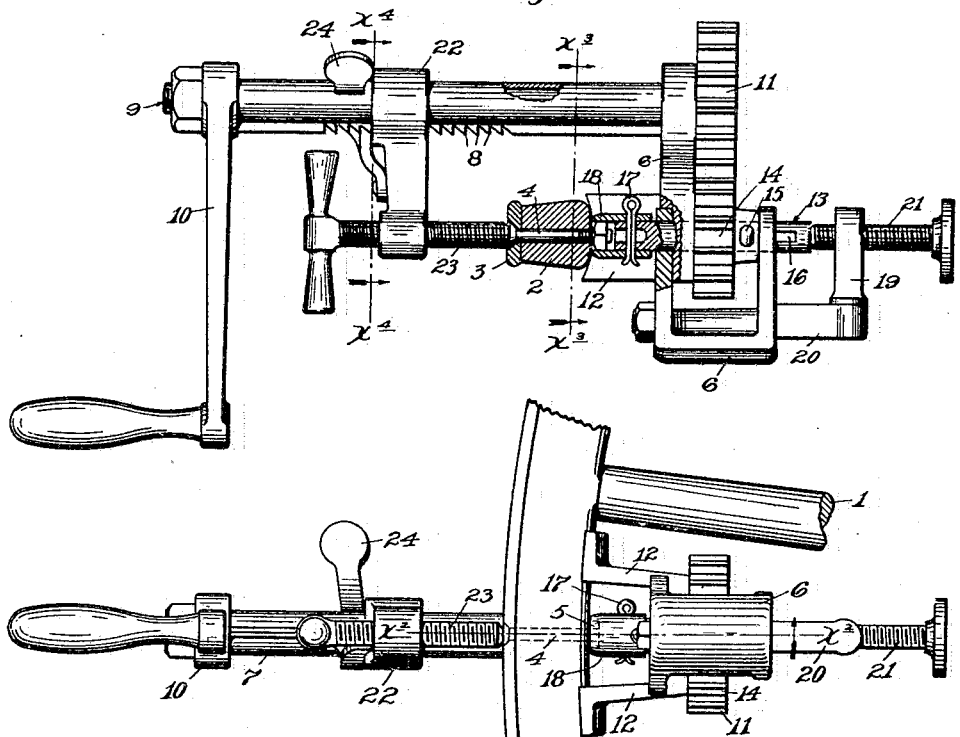
Witnesses.
E. W. Jeppesen
N. S. Kilgore
Inventor:
Peter Lorang.
By his Attorneys.
Williamson & Merchant No. 766,273. PATENTED AUG. 2, 1904.
P. LORANG.
TIRE NUT TIGHTENING DEVICE.
APPLICATION FILED MAR. 28, 1904.
NO MODEL. 2 SHEETS—SHEET 2.

Witnesses
E. W. Jeppesen.
H. D. Kilgore

Inventor.
Peter Lorang
By his Attorneys.
Williamson & Merchant

No. 766,273.

Patented August 2, 1904.

UNITED STATES PATENT OFFICE.

PETER LORANG, OF JORDAN, MINNESOTA, ASSIGNOR OF ONE-HALF TO H. JAENICKE, OF JORDAN, MINNESOTA.

TIRE-NUT-TIGHTENING DEVICE.

SPECIFICATION forming part of Letters Patent No. 766,273, dated August 2, 1904.

Application filed March 28, 1904. Serial No. 200,322. (No model.)

*To all whom it may concern:*

Be it known that I, PETER LORANG, a citizen of the United States, residing at Jordan, in the county of Scott and State of Minnesota, have invented certain new and useful Improvements in Tire-Nut-Tightening Devices; and I do hereby declare the following to be a full, clear, and exact description of the invention, such as will enable others skilled in the art to which it appertains to make and use the same.

My invention has for its object to provide a simple and efficient device for rapidly tightening and loosening the nuts of bolts which are used to fasten the tires to the fellies of wheels; and to this end it consists of the novel devices and combinations of devices hereinafter described, and defined in the claims.

The invention is illustrated in the accompanying drawings, wherein like characters indicate like parts throughout the several views.

Figure 3:
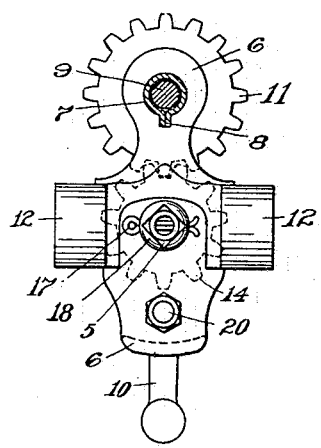
Figure 4:
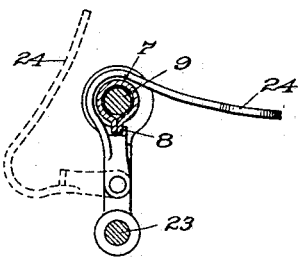
Figure 5:
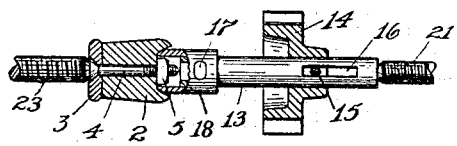

Figure 1 is a plan view showing my improved "nut-tightener," so-called, applied in working position to the rim of a wheel, a portion only of the said wheel being shown. Fig. 2 is a view showing the device chiefly in side elevation, but with the wheel-rim and some other parts sectioned on the line $x^2\ x^2$ of Fig. 1. Fig. 3 is a transverse vertical section taken approximately on the line $x^3\ x^3$ of Fig. 2. Fig. 4 is a transverse vertical section taken approximately on the line $x^4\ x^4$ of Fig. 2; and Fig. 5 is a detail, principally in section on the line $x^2\ x^2$ of Fig. 1, but with some parts shown in full.

The numeral 1 indicates the spokes, the numeral 2 the felly, and the numeral 3 the tire, of an ordinary carriage-wheel. The felly and tire, as is usual, are drawn together by short bolts 4, having nuts 5, the heads of the bolts being countersunk into the tire and the nuts being screwed against the surface of the felly.

The numeral 6 indicates a bracket-like support, which is provided with a rigidly-secured bearing-sleeve 7, that projects from the upper portion thereof and is formed on its under side with a ratchet-toothed bar 8. A shaft 9 is journaled in the sleeve 7 and is provided at one end with a driving-crank 10 and at its other end with a spur-gear 11. Below the sleeve 7 the body-bracket 6 is formed with laterally-spaced bearing-feet 12, which feet are preferably concaved at their outer faces to adapt them to fit approximately the convex inner edge of the felly 2.

Mounted to rotate in and to slide through the pronged lower portion of the bracket 6 centrally between the bearing-feet 12 is a spindle 13, and loosely mounted on the said spindle between the prongs of said bracket is a spur-pinion 14, that meshes with the spur-gear 11. The pinion 14 is caused to rotate with the spindle 13 by means of a key 15, passed diametrically through the hub of said pinion and working in a longitudinal slot 16, formed in the said spindle.

Detachably secured to the forward end of the spindle 13, as shown, by means of a split key 17, is a nut-engaging socket 18, which is formed angular at its outer portion to fit the nuts 5. For different-sized nuts different-sized sockets may be employed. The outer edge of the socket is preferably chamfered off and made sharp, so that the socket may be pressed into the wood of the felly to engage a nut which has been countersunk or drawn into the felly.

In line with and outward of the rear end of the spindle 13 is a nut-block 19, which, as shown, is rigidly supported from the bracket 6 by a bolt or arm 20. The socket 18 is held for engagement with the nut by a thrust-screw 21, which works through the nut-block 19 and engages the outer end of the sliding spindle 13.

Mounted to slide on the bearing-sleeve 7 is an adjustable nut-block 22, which is held against rotation by the rack 8. A clamping-screw 23 works through the lower end of the nut-block 22 and engages the head of the bolt, to the nut of which the socket 18 is applied. The adjustable nut-block 22 may be quickly adjusted into different positions and is adapted to be anchored wherever set by means of a ratchet-like lock-dog 24, pivoted to said block and engageable with the ratchet-teeth of the ratchet-bar 8.

As is evident, when the rim of the wheel is clamped between the feet 12 on one side and the clamping-screw 23 on the other side the device will be held in operative position on the wheel, and the nut, which is engaged by the socket 18, may by movement of the crank 10 be either tightened up or loosened on the bolt. The socket 18 may be forced into engagement with a nut which has been drawn into the felly by pressure applied thereto from the screw 21.

The device described has in practice been found extremely efficient for the purposes had in view. It will of course be understood that the said device is capable of modification within the scope of my invention as herein set forth and claimed.

What I claim, and desire to secure by Letters Patent of the United States, is as follows:

1. In a device of the character described, the combination with a bracket-like support having feet engageable with the wheel-rim and having a clamping-screw coöperating with said feet to clamp said support to the wheel-rim, of a spindle mounted for endwise and rotary movements in said support and provided with a nut-engaging socket, a screw for action on said spindle to force said socket to its work, and a crank geared to said spindle for rotating said socket, substantially as described.

2. The combination with a supporting-bracket 6 having a laterally-projecting bearing-sleeve 7, laterally-spaced clamping-feet 12 and rigidly-supported nut-block 19, of an adjustable nut-block 22 adjustably held on the said sleeve 7, a clamping-screw 23 working through said block 22, a spindle 13 rotatively and slidably mounted in said bracket 6 in axial line with said clamping-screw 23, a clamping screw 21 working through said nut-block 19 and engaging the outer end of said spindle 13, a nut-engaging socket at the inner end of said spindle, a pinion 14 mounted to rotate with said spindle 13 but permitting endwise movements of said spindle, and a shaft 9 journaled in said bearing-sleeve 7 and provided at one end with a crank 10, and at its other end with a gear 11, which gear 11 meshes with said pinion 14, substantially as described.

In testimony whereof I affix my signature in presence of two witnesses.

PETER LORANG.

Witnesses:
C. RODERIG,
J. A. HOLLERBACH.